United States Patent [19]
Harman

[11] 3,745,857
[45] July 17, 1973

[54] DIES FOR CUTTING SHAPES

[75] Inventor: Maurice Harman, Bletchley, England

[73] Assignee: W. Notting Limited, London, England

[22] Filed: Jan. 5, 1971

[21] Appl. No.: 104,055

[30] Foreign Application Priority Data
| Jan. 8, 1970 | Great Britain | 1,037/70 |
| June 17, 1970 | Great Britain | 29,396/70 |
| June 18, 1970 | Great Britain | 29,679/70 |
| Oct. 1, 1970 | Great Britain | 46,723/70 |

[52] U.S. Cl. ............................................. 76/107 C
[51] Int. Cl. ............................................. B21k 5/20
[58] Field of Search .................... 76/107 R, 107 C; 93/58 R

[56] References Cited
UNITED STATES PATENTS
| 3,367,215 | 2/1968 | Rice et al. | 76/107 C |
| R24,450 | 4/1958 | Sarno | 76/107 C |
| 3,322,004 | 5/1967 | Wolfe | 76/107 C |
| 3,000,237 | 9/1961 | Phillips et al. | 76/107 C |

Primary Examiner—Harrison L. Hinson
Attorney—Larson, Taylor & Hinds

[57] ABSTRACT

A method of making a cutting die, including the steps of selecting a sheet of plastics material having a strength of the same order as wood, making slots in the sheet by means of any kind which can progress laterally through the material in all directions, and mounting strips of metal in the slots.

7 Claims, 7 Drawing Figures

PATENTED JUL 17 1973 3,745,857

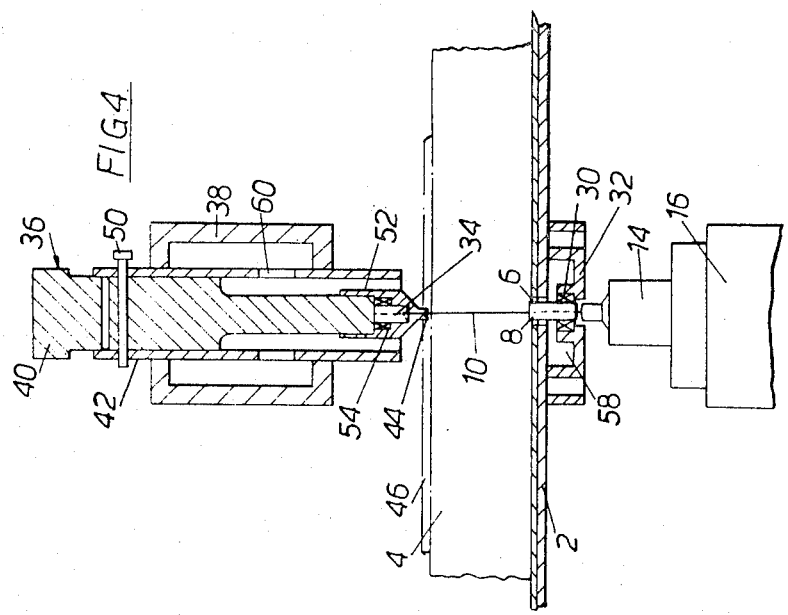
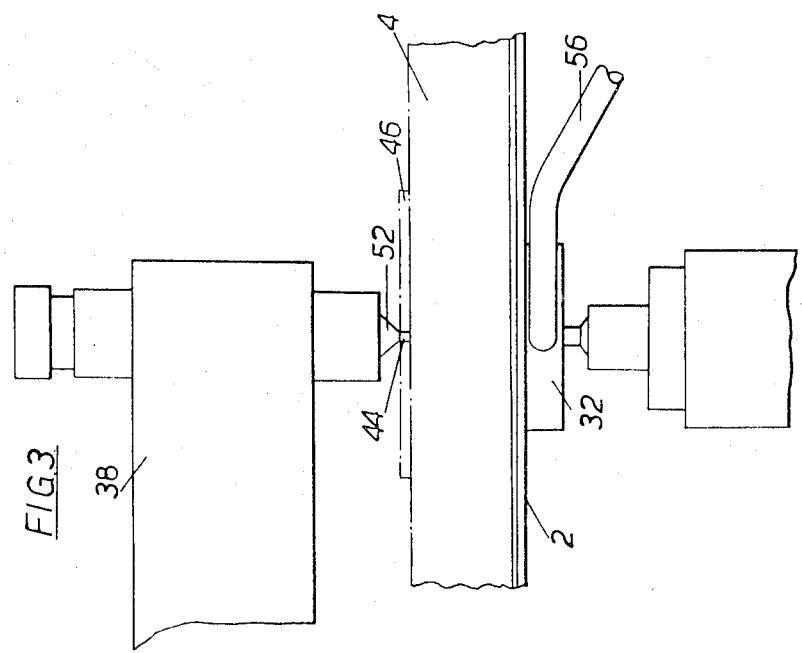

PATENTED JUL 17 1973 3,745,857

DIES FOR CUTTING SHAPES

One known form of die for cutting shapes from sheet material (e.g. carton blanks from cardboard) consists of strips of metal, known as cutting rule, sharpened along one edge and mounted in slots in a sheet of plywood. The thickness of the plywood is a little less than the width of the strip. In use, the plywood is mounted on a press, either on a flat platen or on a cylinder.

Hitherto, the slots, which pass entirely through the plywood, so that the cutting loads on the metal rule are carried directly by the press, have been made by a jig-saw, controlled by hand to follow a pattern drawn or photo-copied on the surface of the plywood.

A tool may be required to cut a large number of identical shapes, for example for cigarette cartons. The process of cutting slots by a jig-saw is not as accurate as is desirable for this purpose. Greater accuracy can be obtained by making a die in several pieces, but multi-piece dies are inconvenient to handle.

According to this invention a method of making a cutting die includes the steps of selecting a sheet of plastics material having a strength of the same order as wood, making slots in the sheet by means of any kind which can progress laterally through the material in all directions, and mounting strips of metal in the slots.

By use of the invention, it is possible to cut the slots at a speed which is economic, and at the same time to obtain a high degree of accuracy, in all desirable respects, namely in position of slots, perpendicularity of slots to the faces of the sheet, width of slots, and parallelism of slot walls.

Moreover the process can easily be controlled, manually or automatically, either by line following or on numerical instructions.

By saying that the means for making the slot can progress laterally in all directions, we exclude a jig-saw, which can only progress in one direction. A jig-saw of course can change direction gradually around a curve, but this is not what we mean.

Preferably the means for making a slot is also able to make a hole at the start of a slot, so that separate preparation of a hole is not required. This is a further distinction from a jig-saw.

The preferred plastics material is known as "Integral-skin polyurethane foam board."

The width of the slots is preferably in the range 0.5 mm to 2.0 mm (about 1½ point to 6 point).

Preferably the means used for making the slots is a pin-like rotary tool. The operative part of the tool may be cylindrical with longitudinal grooves. This tool will be termed "the pin."

It is difficult to discover the way in which the pin actually works as a slot-making tool, because the pin is of small diameter, e.g. 0.7 mm, and rotates at very high speed, e.g. 45,000 rpm. We believe that there is a side milling effect, and we find that dust is produced. At the same time we believed that the plastics material is temporarily heated by the tool and thereby softened, and we find that the walls of the slot made by the tool have a smooth skin. This action of the pin is thus different from that of high-speed rotary tools as used in dentistry, which are cooled by a stream of fluid. The heat generated by the pin must be not so great as to cause undesired side-effects. If the pin is of tungsten, which is preferred because of its stiffness, the limit is attained when the pin starts to oxidise. The rate of lateral feed must be such that heating does not pass this limit.

Supplementary heating may be provided by passing an electricl current through the rotating pin, but we prefer to dispense with electric heating.

To facilitate insertion through the material before starting a slot, the pin may be formed with a cutting tip.

A preferred form of machine incorporating a rotating pin is described later in this specification.

Other plastics materials may be used in place of the preferred one. Cellular material is better than solid, as it is cheaper but yet can have adequate strength and rigidity. Thermosetting materials are better than thermoplastic materials. With a rotating pin, the material must be one which does not adhere to and build up on the pin. The cells may be bubbles in the plastic, or may be cenospheres. The plastics material may include a filler, in particular one, such as graphite, which will have a lubricant effect.

Cellular materials are available in various densities, and the most suitable density of any particular material is best determined by trial, bearing in mind that a reduction in density will be accompanied by reduction in strength, while an increase in density is likely to be accompanied by an increase in cost per unit volume. In a material with integral skin, skins of various densities are obtainable, and a high-density skin is preferable.

Reasons for our preference for integral-skin polyurethane foam board are that it is readily available and is easy to work. We have found that a suitable density for this material is 25 lbs/cu ft (400 Kg/m$^3$). This is about half the density of plywood, and we find that the strength, measured in compression, bending, indentation, and shear, is also about half that of plywood.

The sheet material is conveniently of the existing standard thickness for plywood for supporting cutting rules, namely 18 mm. We prefer to traverse a rotating pin at about 300 mm per minute. By not exceeding this speed, we avoid significant bending of the pin which could cause the slot to become bowed in cross section.

Preferably the pin is driven by an electric high-frequency motor with ball bearings.

The dust formed may require to be blown or sucked away.

The use of a rotating pin is preferred, because it provides a slot with sides which are truly perpendicular to the faces of the sheet, and parallel to one another. It is found that, because of the rotation, the pin remains clean, in suitable material, and hence the width of the slot is uniform.

Examples of other means of making a slot which are less preferred are the application of a narrow beam of radiation, for example by laser beam, electronic beam, ion beam, electrical sparks, electrical arc; a flame, or plasma jet; or a narrow jet, hot or cold, of particles or of a fluid.

As is well known, the slots must have interruptions in order to provide bridges to hold the sheet material together into a single piece. At these places, notches are formed in the metal strip.

Mention has so far been made of strips having a sharpened cutting edge. According to the nature of the blanks to be cut, there can also be strips with edges for creasing, and embossing tools.

The preferred form of machine incorporating a rotating pin will now be described with reference to the accompanying drawings, in which:

FIG. 3 is an enlargement of the part of FIG. 2 in the circle III;

FIG. 4 is a section on the line IV—IV in FIG. 3;

The basic framework of the machine is that of a desk of steel construction. The top of the desk constitutes a table 2 on which can be placed a sheet of material 4 in which slots are to be cut. In the centre of the table there is a small opening 6 (FIG. 4) to accommodate a sleeve 8, through which can slide the operative part of a pin 10.

Figure 5:
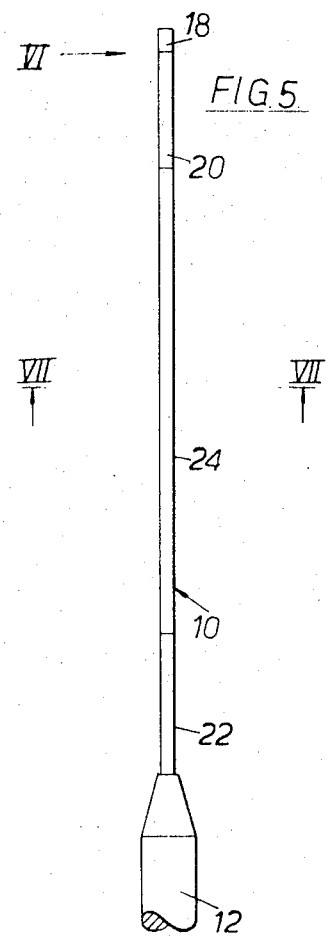
FIG. 5 is a greatly enlarged elevation of the pin.
Figure 6:
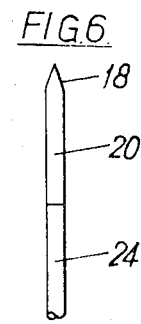
FIG. 6 is a fragmentary elevation, seen in the direction of the arrow VI in FIG. 5.
Figure 7:
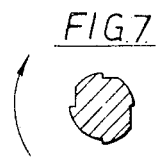
FIG. 7 is a section, still further enlarged, on the line VII—VII in FIG. 5.

The pin is shown in detail in FIGS. 5, 6 and 7. It has a shank 12 which can be gripped by a chuck 14 (FIG. 4) which is directly driven by a high-frequency electric motor 16.

The operative part of the pin is cylindrical, with a diameter substantially equal to the desired width of the slots. Practical test will show whether, in a given material, there is a slight and constant difference between the diameter of the pin and the width of the slots, in which case the diameter of the pin may be chosen accordingly.

The operative part includes a chisel-shaped tip 18, two smooth portions 20, 22 and a longitudinally grooved portion 24. The cross-sectional shape of the grooves is shown in FIG. 7, the direction of rotation being clockwise as indicated by the arrow. The grooves extend in a right-hand helix, at a small angle to the axis of the pin.

Figure 1:
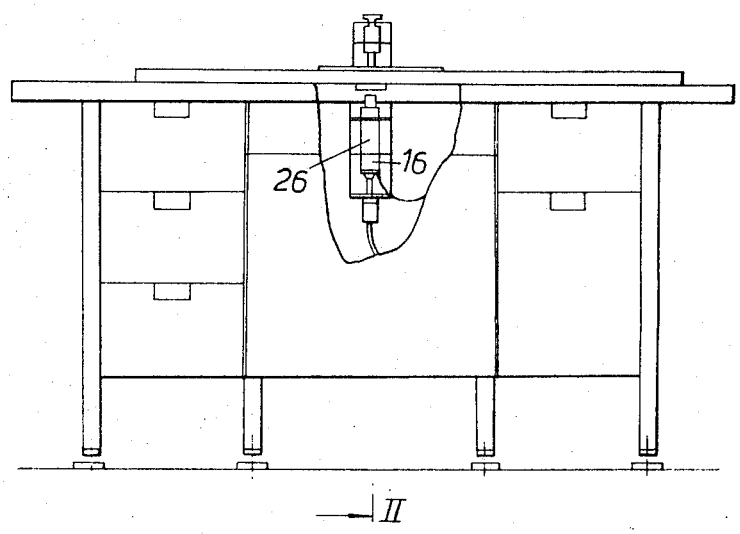
FIG. 1 is a front elevation of the machine, with parts broken away.
Figure 2:
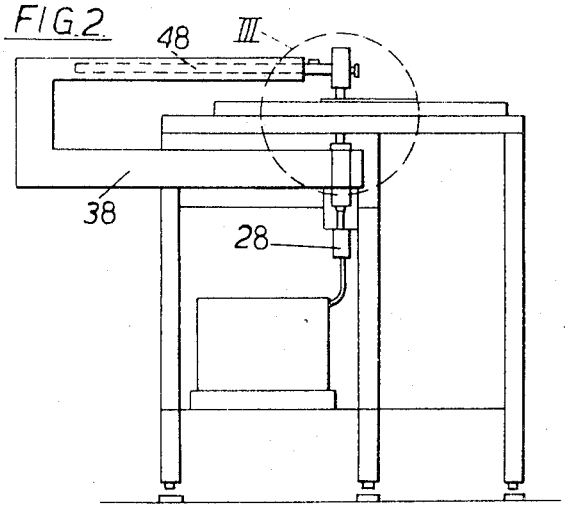
FIG. 2 is a diagrammatic section on the line II—II in FIG. 1.

As shown in FIGS. 1 and 2, the motor 16 can be moved vertically in a guide 26, under the control of a pneumatic cylinder 28. By this means the pin can be moved axially between a lowered position in which the smooth portion 20 lies in the sleeve 8, and a raised position in which the smooth portion 22 lies in the sleeve 8. This sleeve 8 is mounted to rotate about the axis of the pin, by means of a ball bearing 30 supported by a block 32 fixed beneath the table top 2.

When the pin is in the raised position, the smooth portion 20 is supported by a second sleeve 34 (FIG. 4) carried by a head 36. This head is supported by a rigid C-shaped frame 38 fixed to the table (FIG. 2). The head consists of an inner member 40 and an outer tube 42. This tube can slide through a short distance vertically relatively to the upper limb of the C-shaped frame 38. The purpose of this is to raise and lower a small sleeve 44 which lies below the sleeve 34 and is aligned with it. This small sleeve 44 can engage grooves or margins on a template 46, which is secured to the material, and thus act as a guide to relative traversing movement of the material 4 and the pin 10.

This particular apparatus is intended for use where the cost of automatic guidance of the tool 10 would not be justified. The movement of the material 4 relatively to the pin 10 is produced by an operator moving the material by hand by sliding it about over the surface of the table 2. In this movement, the operator is constrained to keep the sleeve 44 in engagement with the template.

The mechanism for raising and lowering the tube 42 relatively to the C-shaped frame 38 is indicated diagrammatically at 48 in FIG. 2. The inner member 40 can be adjusted in position vertically relatively to the tube 42, and then locked by a pin 50, to permit the apparatus to be used with materials of different thickness. The small sleeve 44 is a reduced lower end of a cap 52 which is fixed to the lower end of the member 40, and which serves to support a ball bearing 54 for the sleeve 34. Thus the sleeve 34 can rotate with the pin 10, while the small sleeve 44 does not rotate, and has a central bore which is slightly larger than the pin, so as to provide a running clearance.

To facilitate entry of the tip of the pin into the sleeve 44 and then into the bearing 34, the lower ends of the bores in these two components are each divergent.

The guide openings in the template 46 are preferably all of a uniform width making a sliding fit with the external diameter of the sleeve. The guide openings are thus themselves slots, but of greater width than the slots made in the sheet.

Such guide slots may be made by standard engraving equipment, using an end milling tool, guided by a pantograph which is used to follow an enlarged master template, made for example of pieces of plastics stuck onto a drawing. In practice, in order to enable reasonable fineness of detail to be obtained in the shapes cut in the sheet, the width of the slots in the template should be in the range 1.5 to 2.5 mm.

Aluminium or aluminum-based alloys are suitable materials for a template. The template can be adequately fixed on the sheet of material 4 by providing on the template several sharp pins which pierce the upper skin of the material.

Although it is preferred to have guide slots in the template, so that the sleeve cannot be misplaced, it is possible to provide wider guide openings, such that an operator must ensure that the sleeve slides along the margins of the guide openings.

If it is necessary to remove dust, air is supplied through a pipe 56 (FIG. 3) to a cavity 58 in the block 32, from which the air can flow upwards, through the clearance around the sleeve 8, to the slot being made by the pin. Air and dust are removed by connecting the interior of the C-shaped bracket 38 to an extractor fan (by means not shown). This interior communicates with the space around the sleeve 44 via ports 60 in the tube 42.

An important feature of the machine is that the tool has a free end which can be fed axially through the material, and is arranged so that the working length of tool, between a bearing and the free end, can be varied from a minimum of zero or nearly zero to a substantial maximum value, but without the tool becoming separated from the bearing.

A further feature, of particular value when the sheet material thickness is considerable, is a second bearing which in use is aligned with the tool and is close to the further face of the material, so that when the tool has penetrated the material, the end portion of the tool enters this second bearing.

By these features, the pin is, at all stages of operation, given as much lateral support as possible, so as to provide a high resistance to bending. This is desirable, both to prevent breakage of the pin, and to ensure flat side faces to the slots made by the pin.

I claim:

1. A method of making a cutting die, including the steps of selecting a sheet of plastics material having a strength of the same order as wood, inserting through the sheet a pin-like tool, and then traversing the tool rapidly relatively to the sheet, while rotating the tool at a high speed, and repeating the steps of inserting and traversing, to thereby make slots extending entirely through the sheet and having a uniform width substantially equal to the diameter of the said tool, and mounting strips of metal in the slots.

2. A method according to claim 1, in which the plastics material selected is integral-skin polyurethane foam board.

3. A method according to claim 1, in which the thickness of the sheet is about 18 mm and the width of the slots is in the range 0.5 mm to 2.0 mm.

4. A method according to claim 1, in which the pin is rotated at a speed of the order of 45,000 revolutions per minute.

5. A method according to claim 4, in which the pin is traversed relatively to the material at a speed of the order of 300 mm per minute.

6. A method according to claim 1, in which the pin-like tool used has a free end with a cutting tip and this free end is caused to enter the material axially and pass through the material at the start of each slot.

7. A method as claimed in claim 1 wherein the strips of metal are frictionally mounted in the slots.

* * * * *